(12) United States Patent
Shaw

(10) Patent No.: US 7,284,707 B1
(45) Date of Patent: Oct. 23, 2007

(54) DATA CARD HOLDER

(76) Inventor: Terrence D. Shaw, 5421 N. Main St., Walkertown, NC (US) 27051

( * ) Notice: Subject to any disclaimer, the term of this patent is extended or adjusted under 35 U.S.C. 154(b) by 0 days.

(21) Appl. No.: 11/171,524

(22) Filed: Jun. 30, 2005

(51) Int. Cl.
*G06K 7/00* (2006.01)

(52) U.S. Cl. .................................................. 235/486
(58) Field of Classification Search ............... 235/486, 235/487, 435; 40/209, 200, 204; 221/232
See application file for complete search history.

(56) References Cited

U.S. PATENT DOCUMENTS

| | | | | |
|---|---|---|---|---|
| 5,237,767 | A * | 8/1993 | Kringel et al. ............... 40/652 |
| 5,301,091 | A * | 4/1994 | Chen ......................... 362/497 |
| 5,472,289 | A * | 12/1995 | Kringel et al. ............. 403/228 |
| 5,666,749 | A * | 9/1997 | Waters ........................ 40/204 |
| 5,755,506 | A * | 5/1998 | Ray et al. ................... 362/103 |
| 5,850,957 | A * | 12/1998 | Morris ........................ 224/277 |
| 6,681,507 | B1 * | 1/2004 | Lieziert ........................ 40/209 |
| 6,732,460 | B2 * | 5/2004 | Blakeslee ..................... 40/564 |
| 6,746,127 | B2 * | 6/2004 | Suyama ..................... 359/838 |
| 7,055,755 | B2 * | 6/2006 | Clegg ......................... 235/492 |
| 2006/0027593 | A1 * | 2/2006 | Slocum ....................... 221/232 |

FOREIGN PATENT DOCUMENTS

GB        2282357 A  *  4/1995

\* cited by examiner

*Primary Examiner*—Thien M. Le
*Assistant Examiner*—April Taylor

(57) ABSTRACT

A data card holder is presented for releasable attachment to the rear view mirror of a vehicle. The data card holder includes a base with a slotted shroud having a transparent face. The face provides magnification of the data on the card and a means to illuminate in the form of an LED permits the user to read the card in low or dim light conditions. Below the shroud is an electrical housing containing battery driven circuitry. The front of the electrical housing supports a switch for the LEDs and retainers for holding a second data card against the housing.

16 Claims, 5 Drawing Sheets

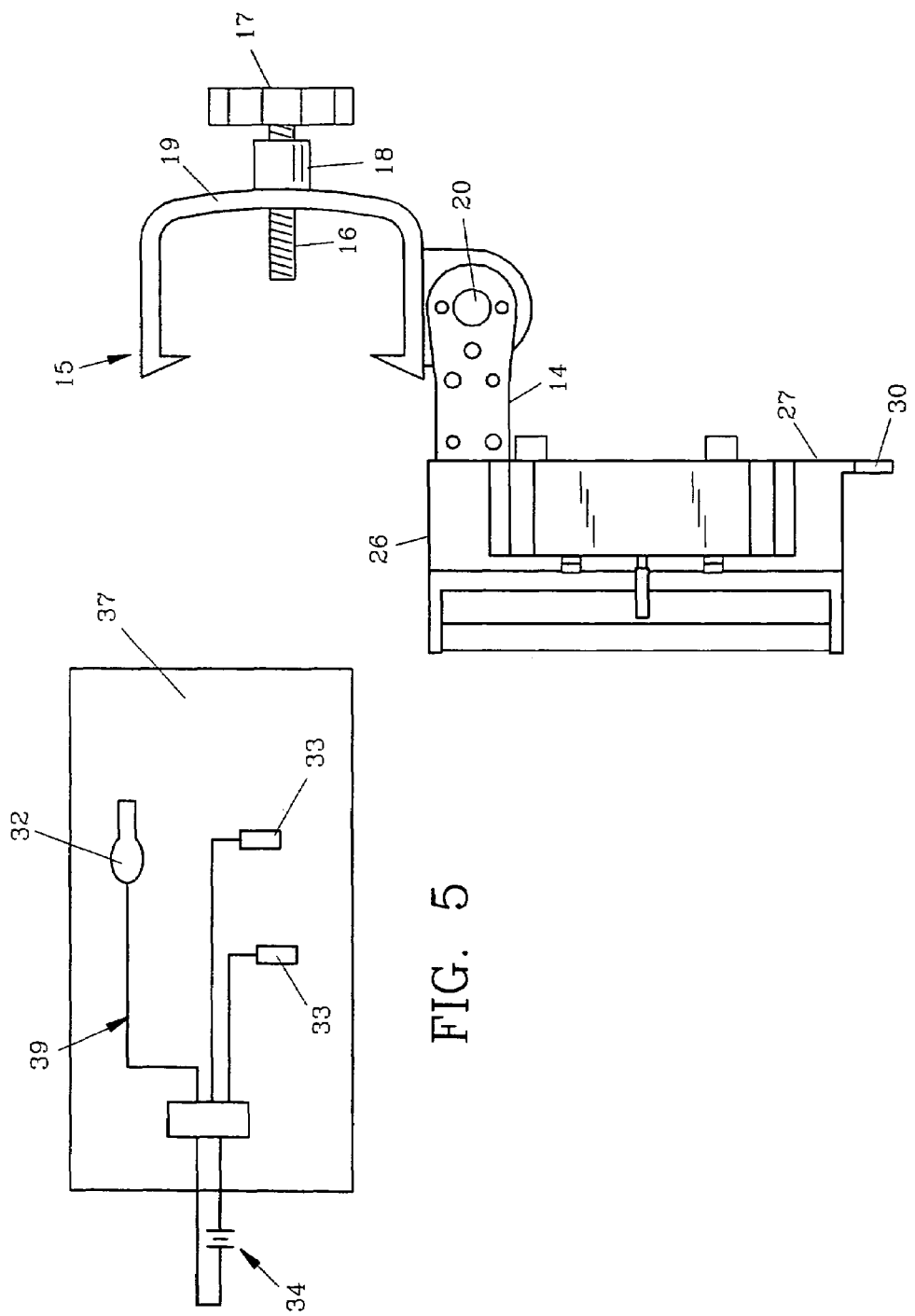

DATA CARD HOLDER

FIELD OF THE INVENTION

The invention herein pertains to a holder for a data card and specifically provides an illuminated data card holder for attachment to an interior rear view mirror of a vehicle.

DESCRIPTION OF THE PRIOR ART AND OBJECTIVES OF THE INVENTION

Traffic enforcement officers routinely stop and issue citations or tickets to vehicle drivers that exceed speed limits or commit other traffic offenses. Traffic officers witness an offense, and then by using flashing lights and/or sirens signal the offender to the roadside. The officer usually parks behind the offender's stopped vehicle and then approaches the driver on foot to obtain the driver's license and registration card. The officer then returns to the patrol vehicle to complete a traffic citation form, usually on a clipboard or small computer. It is a standard procedure to maintain flashing lights on the patrol vehicle as the officer is often approached from the rear by on-lookers either driving or walking. In order to maintain control and avoid potential accidents as the citation is being completed, the officer has to constantly observe the traffic conditions and events which are in front and behind him, frequently glancing in his rear view mirror and through the front windshield. Thus if the driver's license is placed on a lap clipboard or the like, the officer must move his head and eyes from the proximity of the rear view mirror while reviewing the driver's license and registration card. During the time the officer's attention is diverted from the rear view mirror area to the lap, an unsafe and often dangerous condition can develop in front or behind the officer's patrol car. To prevent unsafe conditions and to allow time for evasive action, the present invention was developed and one of its objectives is to provide a data card holder which will maintain a standard state driver's license and vehicle registration card in convenient view at or near the officer's rear view mirror.

It is another objective of the present invention to provide a data card holder which will allow the traffic officer to view the data card while maintaining observation of activity occurring at the front and rear of his vehicle.

It is still another objective of the present invention to provide a data card holder which can be easily, releasably affixed to a rear view mirror without blocking or obstructing the view therethrough.

It is yet another objective of the present invention to provide a data card holder which will magnify, illuminate and provide improved readability of a data card contained therein.

It is a further objective of the present invention to provide a data card holder which can be quickly and easily attached to and released from the rear view mirror of a vehicle and moved from the vehicle, for example to another object as desired.

It is yet another objective of the present invention to provide a data card holder which has a rotatable bracket for ease and convenience in use.

Various other objectives and advantages of the present invention will become apparent to those skilled in the art as a more detailed description is set forth below.

SUMMARY OF THE INVENTION

The aforesaid and other objectives are realized by providing a data card holder having a shroud with a C-shaped bracket affixed to a planar base. The shroud is slotted proximate one end of the base to allow data cards such as a standard state driver's license to be inserted therein. A finger aperture is provided in the rear of the base to allow easy manipulation and removal of the data card. Inside the shroud are a plurality of guides spaced along the top and bottom near the base to assist in directing the data card therein and maintaining the data card in a viewable posture. The face of the shroud is transparent and magnifies the text of the data card for ease in reading. A means to illuminate the data card such as a pair of LEDs are positioned inside the shroud in spacial relation to the base. An electrical housing is affixed to the shroud and contains a removable rear panel. The removable panel is attached by a pair of finger screws to allow access and for battery changing. Inside the electrical housing is a conventional 9V battery which powers a circuit board affixed to a switch positioned on the front of the housing for turning on and off the LEDs. The circuit board contained within the electrical housing includes connectors for the LEDs, switch and battery. On the front of the electrical housing, below the switch are a pair of resilient clips or retainers for holding a second data card such as a registration card against the front of the housing.

In use, the C-shaped bracket is releasably placed on the vehicle rear view mirror inside the passenger compartment and a threaded member secures the data card holder in place. The threaded member affixed to the bracket includes a knob for easy gripping and rotation thereof. The C-shaped bracket is attached to an arm which is rotatably affixed to the rear of the base. The arm includes a channel for receiving a base stud. The stud is spring-loaded and fits within the arm channel. The base stud can be urged outwardly from the arm, rotated and then released in any of four (4) positions for viewing a data card through the shroud face in either vertical or horizontal positions.

BRIEF DESCRIPTION OF THE DRAWINGS

FIG. 5 demonstrates the electrical circuitry in schematic form with the battery connected thereto; and FIG. 6 features the data card holder in a right side elevational view with the shroud rotated 90°.

DETAILED DESCRIPTION OF THE PREFERRED EMBODIMENT AND OPERATION OF THE INVENTION

Figure 1:
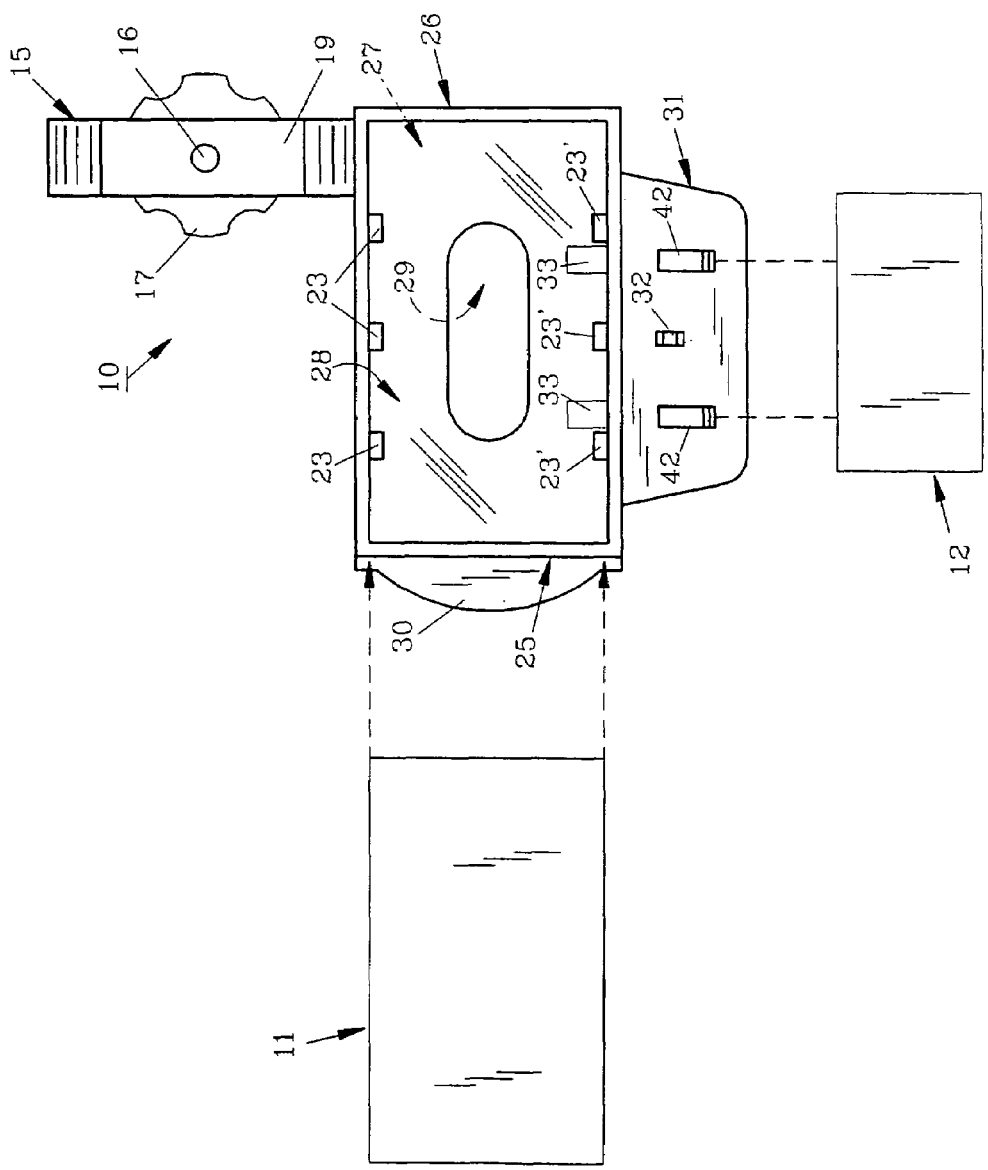
FIG. 1 shows a front view of the data card holder of the preferred form of the invention.

For a better understanding of the invention and its operation, turning now to the drawings, preferred data card holder 10 is shown in a frontal view in FIG. 1 with typical data cards 11 and 12 shown exploded therefrom. Data card 11 represents a typical thin, planar state plastic driver's license whereas data card 12 may be, for example a planar state vehicle registration card. As would be understood other cards or sheets could also be inserted into or attached to data card holder 10 as necessary. Data card holder 10 is preferably formed from a suitable, durable conventional plastic such as by injection or other standard molding techniques.

Figure 3:
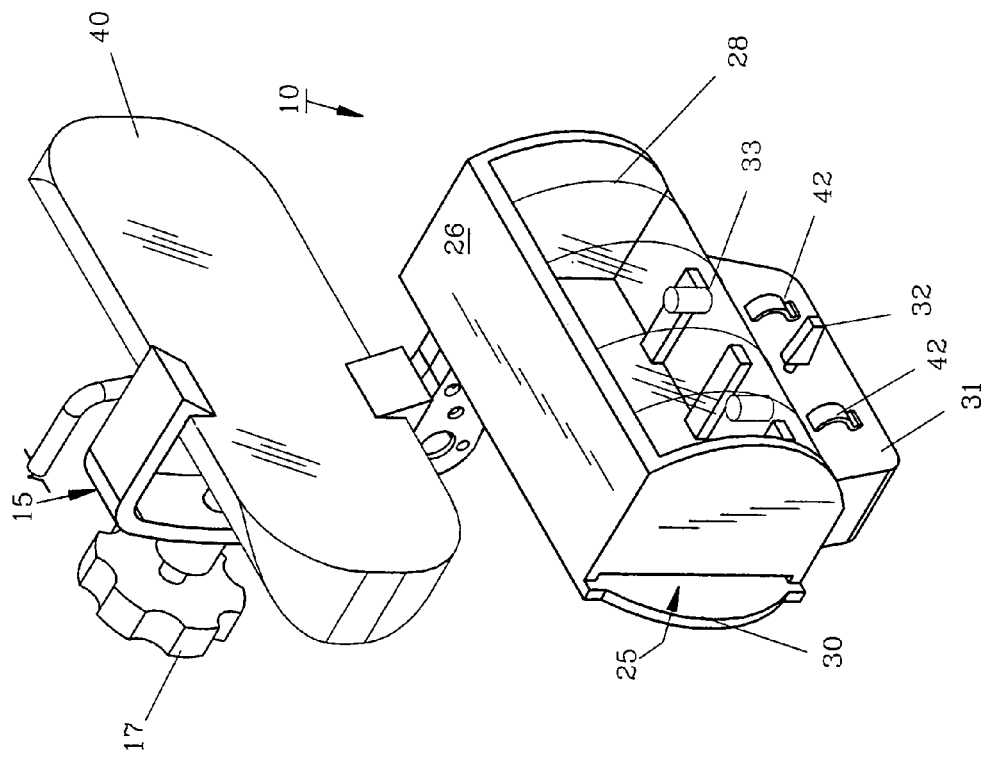
FIG. 3 pictures in perspective view the data card holder of FIG. 1 attached to a vehicle rear view mirror.
Figure 4:
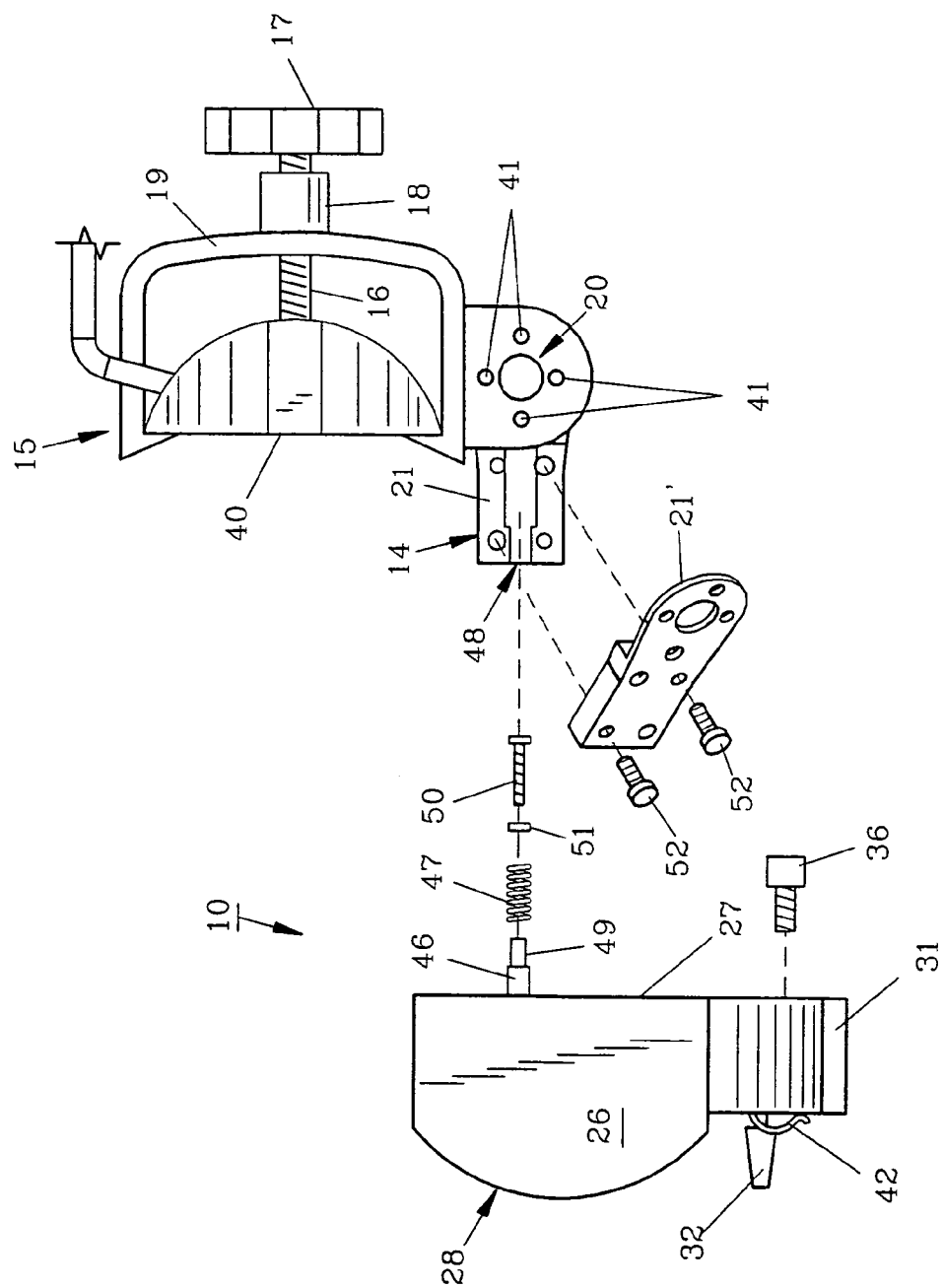
FIG. 4 depicts the data card holder shown of FIG. 3 in an exploded right side elevational view.

Preferred bracket 15 is preferably C-shaped as shown in FIGS. 4 and 6 and includes vertical frame member 19 to engage conventional rear view mirror 40 as shown in FIGS. 3 and 4 suspended from the front windshield or as otherwise as typical in a motor vehicle. Other types of brackets such as straps, bands, clips, bolts, fasteners or the like could also be used but are not preferred. Bracket 15 includes threaded member 16 with knob 17 which acts as a means to secure bracket 15 in place. Tightening or loosening threaded member 16 by manual rotation during the positioning of data card holder 10 on mirror 40 is easily accomplished. Threaded member 16 is rotated within nut 18 (FIG. 4) affixed to frame member 19. Threaded member 16 passes through frame member 19 to contact the rear of mirror 40 (FIG. 4). Thus by rotating threaded member 16, data card holder 10 can be securely affixed to and released from rear view mirror 40 or to another suitable object as desired, such as to a shelf of an office desk (not seen).

Bracket 15 is rotatably affixed to arm 14 by axle 20 and secured by pins 41. Arm 14 in turn selectively allows rotation of base 27 to permit card holder 10 to rotate as shown in FIG. 6. As shown in FIG. 4, arm 14 includes left and right mirror halves 21, 21' secured together by bolts 52 on axle 20. Arm 14 thus participates in two (2) different planes of rotations. Lug 46 positioned on base 27 and arm port 48 of arm 14 are both rectangular in cross-section to provide four (4) positions for lug 46 to be positioned in arm port 48. Coil spring 47 is positioned on finger 49 and maintained thereon by washer 51 and bolt 50 within arm port 48. Bolt 50 is threadably received within finger 49. Coil spring 47 maintains arm 14 tensioned in place against base 27 as selected. Lug 46 and finger 49 are preferably, integrally molded or may be otherwise attached to the rear of base 27. With card holder 10 positioned on rear mirror 40, base 27 can be manually pulled from arm 14 through arm port 48 and then rotated as further seen in FIGS. 4 and 6, for example, to read data cards which have either a landscape or a portrait format. Spring 47 then urges lug 46 to return fully into arm port 48.

In use, a typical driver's license or data card 11 as shown in FIG. 1 is manually directed into slot 25 of data card holder 10 where it slides between base 27 and a plurality of lateral guides 23, 23' (FIG. 1) spaced along the inside top and bottom respectively of shroud 26 for assistance in guiding and maintaining data card 11 in an upright posture. Data card 11 can then be easily viewed through transparent face 28 of shroud 26. Shroud 26 fits over and is joined to base 27 as by integrally molding techniques to cover base 27 (FIGS. 1 and 4). Slot 25 is formed in shroud 26 along one end of base 27 proximate shelf 30 which is also affixed to base 27 such as during the molding or forming of base 27. Planar base 27 also includes finger aperture 29 seen in FIG. 2 which allows the user to manually manipulate data card 11 within data card holder 10. Arcuate face 28 of shroud 26 is preferably formed from a conventional transparent polymeric material and is arcuate perpendicular to its longitudinal axis to provide a usual magnifying effect while viewing a data card contained within shroud 26. This magnification increases the viewing ability and convenience for the user. Face 28 could also be formed of glass but such is not preferred. Except for face 28, shroud 26 is integrally formed with base 27 although it could be formed separately and affixed thereto by conventional fastening techniques.

Positioned below shroud 26 and joined thereto is electrical housing 31. Electrical housing 31 as shown in FIG. 1 includes on/off switch 32 for operating LEDs 33 which act as a means to illuminate the interior of shroud 26. As would be understood standard light bulbs could also be used but are not preferred. LEDs 33 are positioned or spaced from base 27 to illuminate data card 11 inserted into data card holder 10.

Figure 2:
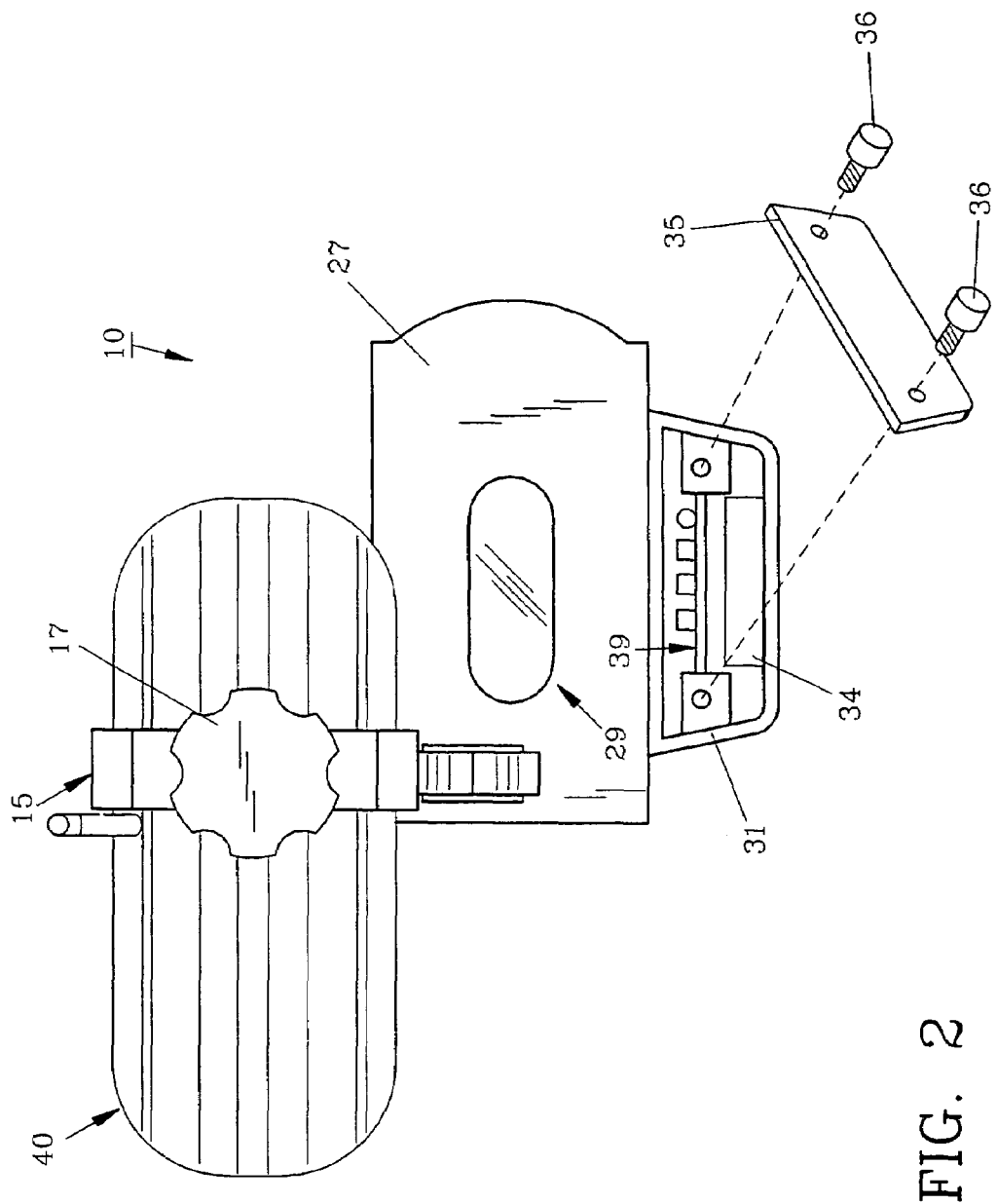
FIG. 2 illustrates a rear view of the data card holder of FIG. 1 attached to a rear view mirror with the electrical housing panel removed.

Rear panel 35 of electrical housing 31 is shown removed in FIG. 2 by manually loosening finger screws 36. As seen in FIG. 2, panel 35 and electrical housing 31 enclose power supply 34, preferably a standard 9V battery, and electrical circuitry 39 on circuit board 37 also seen in FIG. 5. Circuit board 37 provides connections for LEDs 33 and switch 32 with electrical circuitry 39. Electrical housing 31 can be easily accessed by removal of rear panel 35 as needed and electrical housing 31 provides support for card retainers 42 which will resiliently "clip" a second data card such as data card 12 (FIG. 1) to the front of electrical housing 31 where it remains conveniently viewable as needed. This allows the viewer to simultaneously read data card 11 contained within shroud 26, data card 12 affixed with retainers 42 and to observe outside activity through rear view mirror 40 without excessive eye or head movement.

The illustrations and examples provided herein are for explanatory purposes and are not intended to limit the scope of the appended claims.

I claim:

1. A holding device for a data card comprising:
a base, electrical circuitry, said electrical circuitry positioned proximate said base, a rotatable arm, said rotatable arm affixed to said base, a bracket, said bracket affixed to said rotatable arm and a shroud, said shroud attached to said base.

2. The holding device of claim 1 further comprising an illuminating means, said illuminating means connected to said electrical circuitry.

3. The holding device of claim 1 further comprising a battery, said battery connected to said electrical circuitry.

4. The holding device of claim 1 further comprising a switch, said switch connected to said electrical circuitry.

5. The holding device of claim 1 wherein said shroud comprises a transparent face, whereby said transparent face allows viewing of the data card.

6. The holding device of claim 5 wherein said shroud defines a card slot, said card slot positioned proximate said base.

7. The holding device of claim 1 wherein said base defines a finger aperture, said finger aperture for maneuvering a data card positioned on said base.

8. The holding device of claim 1 further comprising a means to secure said bracket, said bracket securing means attached to said bracket.

9. The holding device of claim 1 wherein said rotatable arm is selectively turned to accommodate viewing of the data card.

10. The holding device of claim 1 further comprising an electrical housing, said electrical housing attached to said shroud.

11. The holding device of claim 10 further comprising: a retainer, said retainer positioned on said electrical housing, wherein said retainer for maintaining a data card thereon.

12. A holding device for a data card comprising; a base; said base defining a finger aperture for maneuvering a data card within said base; a shroud attached to said base, said shroud comprising a transparent face, and wherein the transparent face is in opposing relation to said base; a means for illuminating the data card, said illuminating means proximate to said shroud; and a bracket affixed to said base for mounting purposes whereby a data card positioned on said base is viewed through said transparent face.

13. The holding device of claim 12 wherein said transparent face provides a magnifying effect.

14. The holding device of claim 12 further comprising an electrical housing, said electrical housing affixed to said shroud.

15. A holding device for a data card comprising: a base; a bracket affixed to said base; a shroud attached to said base; a means for illuminating the data card, said illuminating means proximate to said shroud; and a means for guiding said data card into said base, said guiding means affixed to said base.

16. The holding device of claim 15 further comprising a shelf, said shelf affixed to said base.

* * * * *